US008281988B2

(12) United States Patent
Kamuf

(10) Patent No.: US 8,281,988 B2
(45) Date of Patent: Oct. 9, 2012

(54) DEVICE FOR CENTRALLY MONITORING THE OPERATION OF AUTOMATED BANKING MACHINES

(75) Inventor: Robert Kamuf, Warburg (DE)

(73) Assignee: Wincor Nixdorf International GmbH (DE)

( * ) Notice: Subject to any disclaimer, the term of this patent is extended or adjusted under 35 U.S.C. 154(b) by 280 days.

(21) Appl. No.: 12/603,825

(22) Filed: Oct. 22, 2009

(65) Prior Publication Data

US 2010/0293417 A1 Nov. 18, 2010

(30) Foreign Application Priority Data

May 14, 2009 (DE) ........................ 10 2009 021 130

(51) Int. Cl.
*G06Q 40/00* (2012.01)

(52) U.S. Cl. ........................................ 235/379; 714/48

(58) Field of Classification Search .................. 235/379; 714/48

See application file for complete search history.

(56) References Cited

U.S. PATENT DOCUMENTS

| | | | | |
|---|---|---|---|---|
| 4,931,963 | A | 6/1990 | Kimura et al. | |
| 5,774,377 | A | 6/1998 | Eidson et al. | |
| 6,842,742 | B1 | 1/2005 | Brookner | |
| 2002/0091972 | A1* | 7/2002 | Harris et al. | 714/47 |
| 2003/0116621 | A1* | 6/2003 | Duncan | 235/379 |
| 2005/0263582 | A1* | 12/2005 | Yokoi et al. | 235/379 |
| 2010/0052237 | A1* | 3/2010 | Herczeg et al. | 271/3.16 |

FOREIGN PATENT DOCUMENTS

| | | | |
|---|---|---|---|
| DE | 3639755 | | 11/1986 |
| DE | 100 29 642 | B4 | 12/2001 |
| DE | 10 2004 015 222 | A1 | 10/2005 |
| EP | 1 672 500 | | 6/2006 |
| EP | 1 672 500 | A2 | 6/2006 |
| EP | 1669956 | | 6/2006 |
| GB | 2 290 872 | | 1/1996 |
| GB | 2 290 872 | A | 1/1996 |
| WO | 02-054223 | | 7/2002 |
| WO | WO 02/054223 | A1 | 7/2002 |

* cited by examiner

*Primary Examiner* — Daniel Hess
*Assistant Examiner* — Rafferty Kelly
(74) *Attorney, Agent, or Firm* — Harness, Dickey & Pierce, P.L.C.

(57) ABSTRACT

The invention relates to an invention for the central monitoring of the operation of automated banking machines (ATM). The operating signals from actuators (31) and sensors (32) of an automated banking machine (ATM) are used to assemble operating characteristics of the actuators (31) and sensors (32) into data records from operating signal patterns (by time segments. These data records are transmitted from the automated banking machine (ATM) to a central monitoring device (20) in which the operating signal patterns are compared with operating signal patterns from corresponding earlier time segments. A trend toward a change in operating characteristics can be ascertained for the respective actuator (31) or sensor (32), which trend can be used for early replacement of said actuator or sensor.

8 Claims, 4 Drawing Sheets

DEVICE FOR CENTRALLY MONITORING THE OPERATION OF AUTOMATED BANKING MACHINES

BACKGROUND OF THE INVENTION

1. Technical Field

The invention relates to a device for centrally monitoring the operation of automated banking machines in which the deposit or dispensing of bank notes is controlled as a function of a program and sensor signals by means of actuators, and data records are generated by time segments from operating signal patterns from the automated banking machine or its modules, and said patterns are transmitted to a central evaluating device where the operating signal patterns are compared by time segments with predetermined operating signal patterns.

2. Discussion

Automated banking machines are preferably operated in what are known as device pools. Transmission of the data records can be carried out over a network assigned to the device pool, over the Internet or over a data memory, for example, a USB memory or a CD/DVD. The data records transmitted are analyzed in the central evaluation device in order to block the issuance of cash in the event of a malfunction, or failure of a machine or a component (e.g. cash module), to initiate an error signal, or to shut down the automated banking machine in question completely. Maintenance work or even repairs can then be performed subsequently.

The expenditure of time and money resulting from maintenance and repairs can be considerable, depending on the age and operating location of an automated banking machine. This is particularly true of device pools where long distances have to be covered between the operating location of automated banking machines and central maintenance and repair facilities, as the result of which downtime is incurred and the cost rises in an unacceptable manner.

SUMMARY OF THE INVENTION

An object of the invention is to improve monitoring of automated banking machines in such a way that complete breakdowns and the associated downtimes are reduced.

The invention achieves this object with a device of the type named at the beginning by generating the data records from operating signals from the actuators and sensors in the automated banking machine, deriving the operating characteristics from the data records of the respective actuator or sensor in the central evaluation device, and comparing said characteristics with corresponding operating characteristics from previous evaluation time segments, and comparing the results of the comparison with standard values, a warning signal being issued if said values are exceeded.

The invention is based on the consideration that the recording of time changes in the operating characteristics of elements that ultimately perform the individual mechanical switching functions in an automated banking machine when transporting bank notes permits early detection of a trend to an operating failure in a sensor or actuator. Signal amplitude, for example, is an operating characteristic of an actuator. Under the invention, the signals that are necessary in any case to energize an actuator are used to generate a functional analysis to detect failure trends from the change in operating characteristics. Depending on the magnitude of such a change, the questionable element can be replaced before the element fails completely. In this way, long downtimes for an automated banking machine can be avoided.

Monitoring of this kind accordingly does not consist in simply detecting operating failures in the course of operation of an automated banking machine, but rather the operating signals available from actuators in normal operation are used to determine failure trends at an early point and, as part of maintenance operations that are necessary in any case, to enable replacement of such actuators and sensors in which a functional failure can be anticipated.

BRIEF DESCRIPTION OF THE DRAWINGS

Further aspects of the invention that facilitate achieving the object established will become apparent from the following description of an embodiment with reference to the drawing.

DESCRIPTION OF THE PREFERRED EMBODIMENTS

Figure 1:
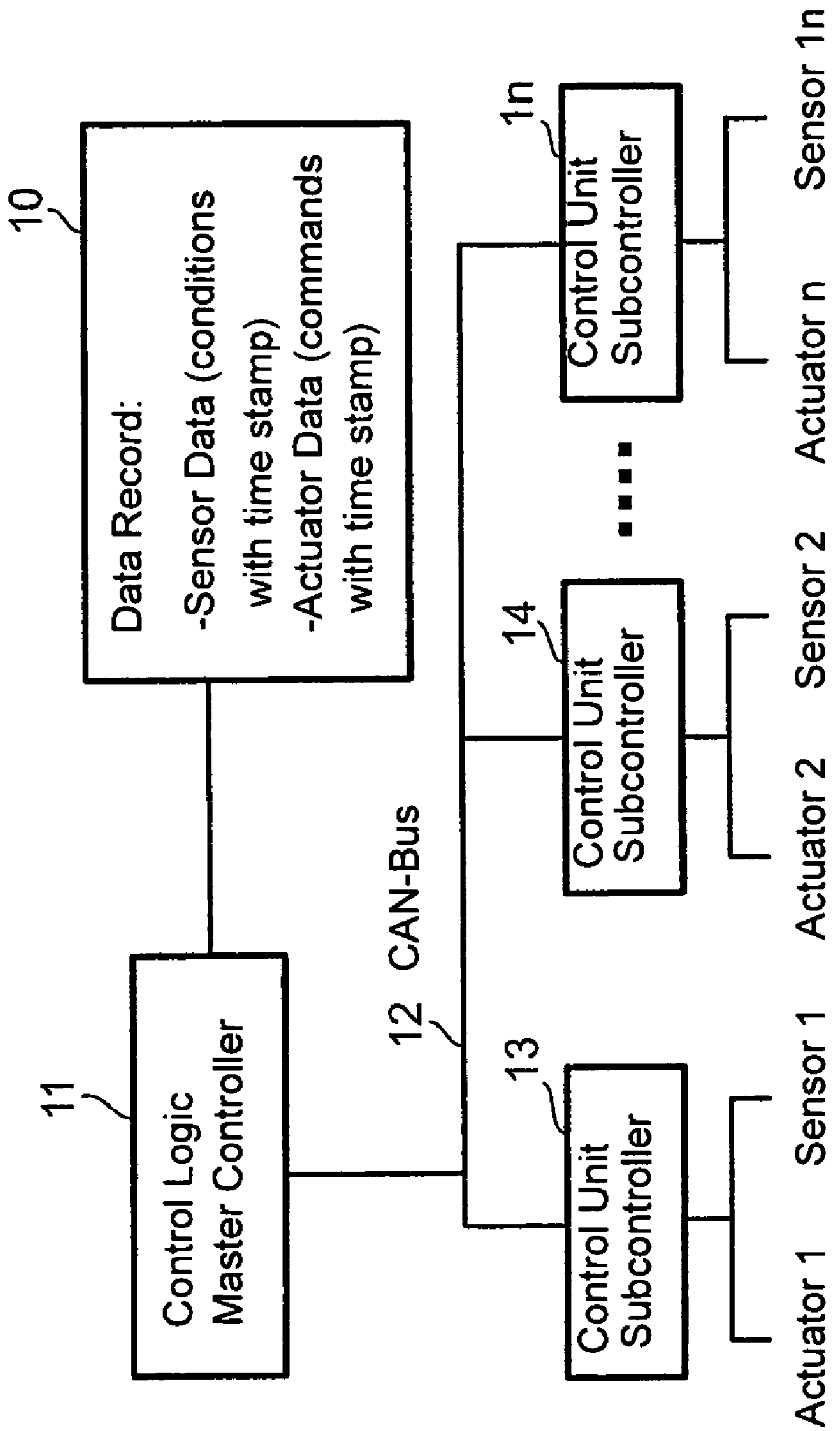
FIG. 1 shows the theoretical structure of an automated banking machine to the extent that it is relevant to the invention.

FIG. 1 shows the theoretical structure of an automated banking machine to the extent that it is relevant to the invention. The automated banking machine contains a system computer 10 that, in conjunction with a control logic (master controller) 11 and over a CAN bus 12, activates control units (sub-controllers) 13, 14, . . . 1*n* during operation of the automated banking machine that are connected in turn to a respective actuator and a sensor. Examples of actuators are motors for belt drives, paddles, stacking wheels, rollers, lift solenoids for diverters, etc. Examples of sensors are light curtains, micro-switches, Hall sensors, etc.

A plurality of sensors and actuators are disposed in the automated banking machine along the transport path of the bank notes, provided with commands via the control logic 11 that come from an operating program stored in the system computer 10. The sequence of the operating program is controlled by sensor signals that report activation of the actuators and/or the passage of bank notes on the transport path.

From the signals that result as the sensors and actuators are operated (command signals), data records are generated in system computer 10 that represent the mode of operation of the sensors and actuators as sensor data and actuator data. These data records are furnished with time information (time stamp) so that their occurrence, or rather the occurrence of the command signals, can be sorted chronologically when the data records are recorded in system computer 10, or are transmitted to a central evaluation device.

Figure 2:
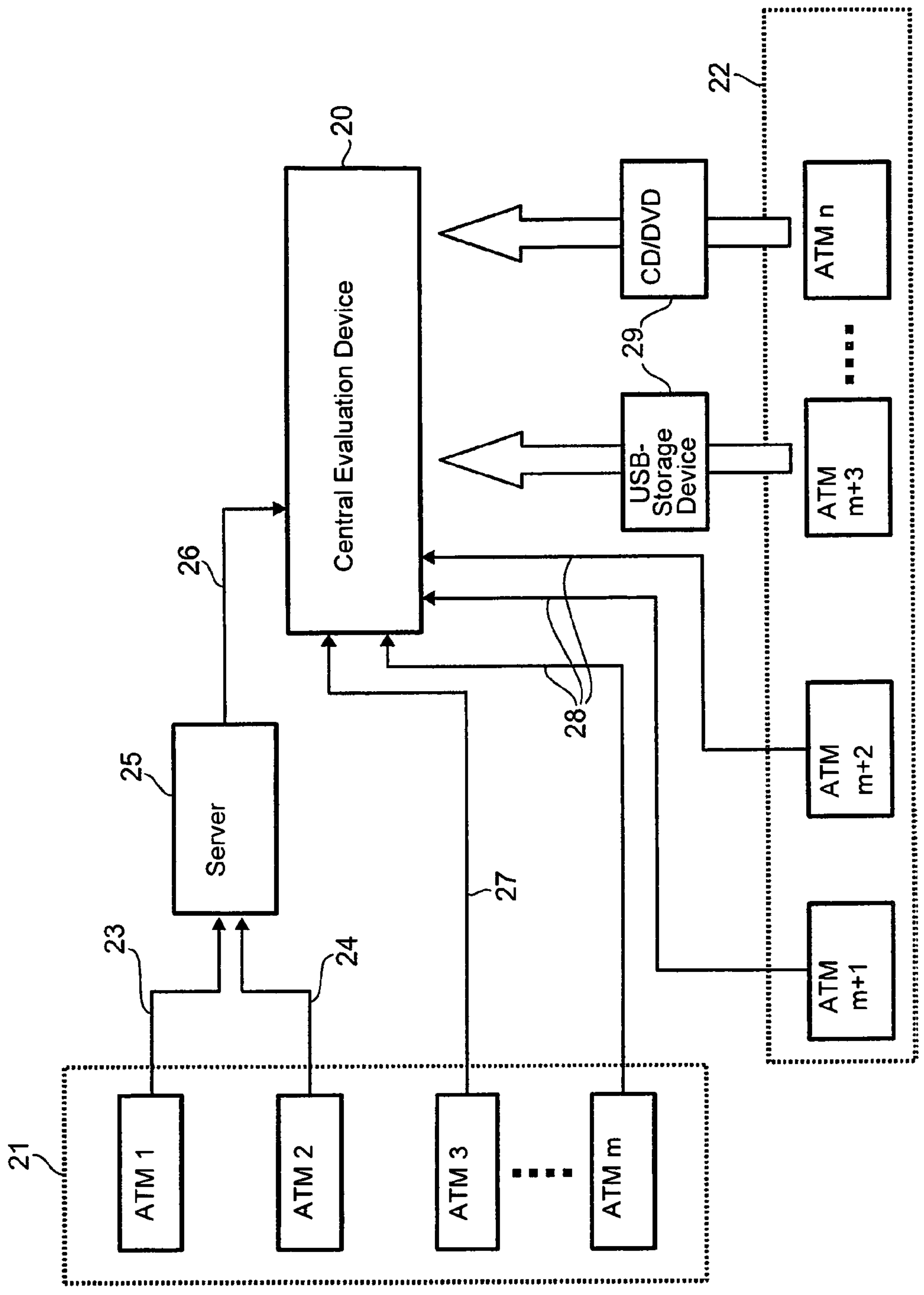
FIG. 2 shows an example of a maintenance network for a device pool consisting of several automated banking machines.

A maintenance network for a device pool is shown in FIG. 2, consisting of several automated banking machines (ATMs). In this example, a central evaluation device 20 is provided for automated banking machines ATM1 to ATMm and ATMm+1 to ATMn. These automated banking machines are installed in two banks 21 and 22. Automated banking machines ATM1 and ATM2 for bank 21 are connected over network connections 23 and 24 and a server 25 and network connection 26 to central evaluation device 20.

The network connections may be wired and routed over the Internet, for example. A wireless connection to central monitoring device 20 is also conceivable.

Automated banking machines ATM3 to ATMm of bank 21 and automated banking machines ATMm+1 and ATMm+2 of bank 22 are connected respectively over a direct network connection 27 or 28 to central evaluation device 20. Data records for each automated banking machine are transmitted over network connections 23, 24, 25, 26, 27 and 28 from the system computer 10 (FIG. 1), and these data records contain sensor and actuator operating signal patterns that reflect operating characteristics for each sensor and actuator in the respective automated banking machine. Each data record to be evaluated in evaluation device 20 applies to a specified time period, one day for example.

The data records can also be transmitted by means of a hard storage device 29, e.g. by means of a USB storage device or by means of a CD/DVD, to central evaluation device 20.

The transport path for the bank notes in an automated banking machine is re-routed by diverters as a function of command signals. A diverter consists of a diverter element, a lift solenoid functioning as an actuator, and a light curtain that monitors the diverter position and therefore functions as a sensor. The diverter element is switched, or moved from a first to a second position, as the lift solenoid, meaning the actuator, is energized and moves the diverter element. When said element moves through the light path of the light curtain, the latter emits a sensor signal. If the actuator and sensor data for this function are recorded, the switch time for the diverter can be calculated from a chronological observation of the time when the lift solenoid was energized and the time when the diverter element passed through the light path of the light curtain. This switch time is an operating characteristic of the diverter that can be studied further during the central evaluation.

Figure 3:
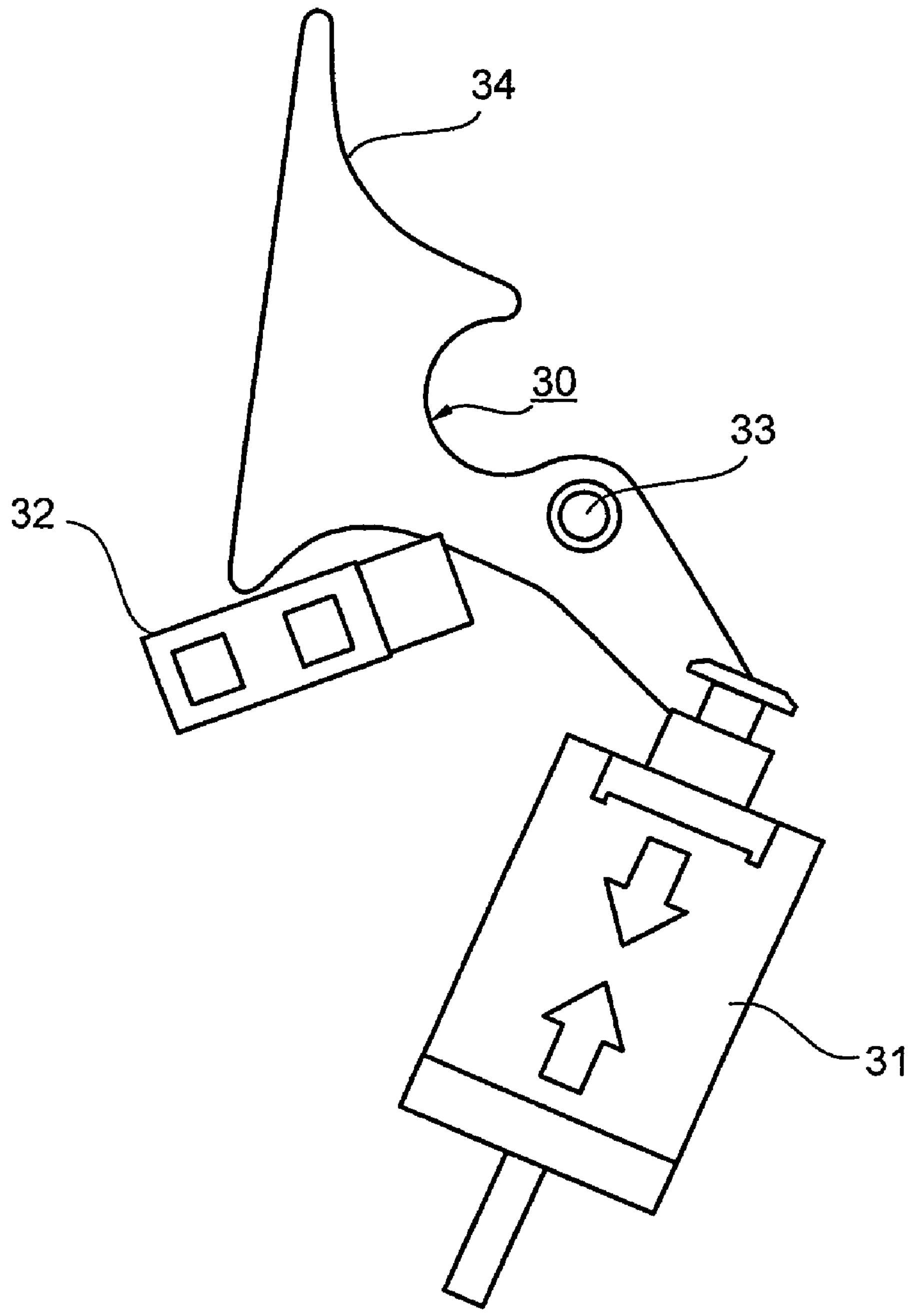
FIG. 3 shows an example of a diverter mechanism in an automated banking machine.

FIG. 3 shows schematically a diverter mechanism with a diverter element 30 that is actuated by a lift solenoid 31 when the latter pivots said element about an axis of rotation 33. Diverter element 30 has a curved luminous area 34 that can be pivoted in a manner not shown in detail here into a transport path in order to change the transport direction of a banknote impinging on said area. This process is reported by means of light curtain 32 to the assigned control unit 13, 14, . . . (FIG. 1) that emits appropriate operating signals to the associated control logic 11 so that sensor data and actuator data consisting of switch-on and switch-off signals can be stored in the system computer (FIG. 1) of the automated banking machine in order to transmit them by time-segment to central evaluation unit 20 (FIG. 2) as data records.

Figure 4:
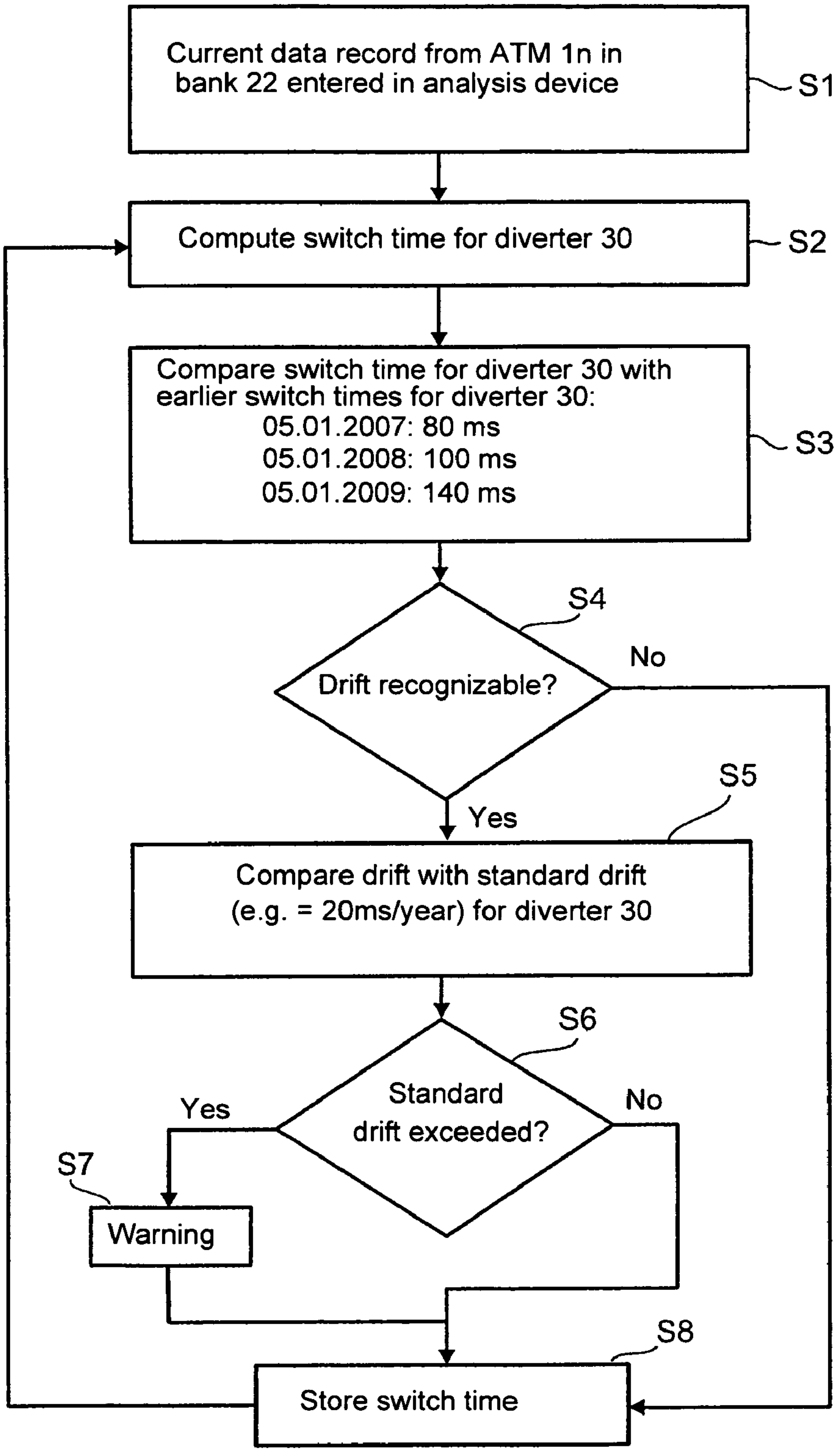
FIG. 4 shows a flow chart for monitoring the diverter mechanism from FIG. 3 in the central evaluation device of the automated banking machine.

The operating characteristic ascertained from a respective data record, meaning for example, the switch time of the diverter shown in FIG. 3, is compared in central evaluation unit 20 with corresponding operating characteristics from this diverter from past evaluation periods. If a trend can be detected from these comparisons, for example toward lengthening the switch time of the diverter, said trend can be compared with specified standard variables for the entire device pool. Exceeding the specified standard variable may lead to a warning signal. This process is explained with reference to the flow chart shown in FIG. 4 that represents a monitoring process for the diverter mechanism shown in FIG. 3.

If a current data record, e.g. from automated banking machine 1*n* of bank 22, is transmitted to central evaluation device 20 (FIG. 2), said record is input into said device in a step S1. In step S2, the switch time of diverter 30 (FIG. 3) is calculated from the data record received. In step S3, the switch time of diverter S3 calculated in step S2 is compared with earlier switch times for this diverter that were stored in central evaluation device 20 (FIG. 2). For the example shown, step 3 shows the comparison of the switch time with earlier switch times that were collected on May 1, 2007 and May 1, 2008. A value of 140 milliseconds is shown for the current switch time from May 1, 2009, while the preceding switch times are 80 milliseconds and 100 milliseconds.

In step S4, it is ascertained whether a trend can be detected from the switch times that were compared with each other in step S3. A trend toward lengthening the switch time emerges. If this trend is detected in step S4, it is compared in step S5 with a standard trend that may be, for example, 20 milliseconds. If this standard trend is exceeded, which applies in the case of the values 100 milliseconds and 140 milliseconds in step S3, a decision is made in step S6, and a warning signal issued in step S7. In step S8, the last switch time ascertained for diverter 30 is stored, meaning the time of 140 milliseconds for the present example, so that it is available for future evaluations.

If it is ascertained in step S6 that the specified standard trend was not exceeded, the process moves directly to step S8, and the switch time ascertained for diverter 30 is stored. Similarly, the switch time in step S8 is stored directly after step S4 if a trend toward change should not occur.

Using this procedure, an operational characteristic can be ascertained for any mechanical and/or electrical functions of an automated banking machine that can be evaluated. Since it is simultaneously saved and compared with previously ascertained operating characteristics, it is possible to undertake a trend evaluation and generate standard trends for a device pool. If these standard trends are exceeded, mechanical and/or electrical elements can be replaced before they fail as the result of fundamental operating defects.

Central evaluation device 20 (FIG. 2) operates with the same information as the operating program running in the control logic 11 of an automated banking machine. In this way, the operating characteristics of the automated banking machine can be evaluated in detail, and, after a period of operation has passed, operating characteristics can be ascertained that could lead to an operating failure at a later time. It is possible as a result to undertake preventive measures as part of maintenance operations, lacking which the failure of individual elements would not be prevented, and it would be necessary to shut down an automated banking machine completely.

The invention claimed is:

1. A device for remotely monitoring operation of an automated banking machine (ABM) comprising:
- a central evaluation device configured to:
  - receive a data record including a plurality of switch speeds of a switch of the ABM, each of the switch speeds calculated at a different period in time;
  - compare the two most recently calculated switch speeds to identify an observed switch speed change;
  - compare the observed switch speed change to a predetermined acceptable switch speed change to determine if the observed switch speed change is greater than the acceptable switch speed change; and
  - generate a warning signal if the observed switch speed change is greater than the acceptable switch speed change;
- wherein each of the switch speeds is a time difference between when a lift solenoid is energized and when actuation of a diverter element is detected by a sensor.

2. The device of claim 1, wherein the data record is stored in a storage module of the central evaluation device.

3. The device of claim 1, wherein the central evaluation device is included in a maintenance network of a device pool including several automated banking machines.

4. The device of claim 3, wherein the data record is transmitted to the central evaluation device by means of hard storage devices in the maintenance network.

5. A method for remotely monitoring operation of an automated banking machine (ABM) comprising:

calculating a plurality of switch speeds of a switch of the ABM, each of the switch speeds calculated at a different period in time;

generating a data record including the plurality of the switch speeds;

transferring the data record to a central evaluation device remote to the ABM that is configured to receive a plurality of data records from a plurality of ABMs;

comparing the two most recently calculated switch speeds to identify an observed switch speed change, the comparison performed using the central evaluation device;

comparing the observed switch speed change to an acceptable switch speed change to determine if the observed switch speed change is greater than the acceptable switch speed change; and generating a warning signal if the observed switch speed change is greater than the acceptable switch speed change;

wherein each one of the plurality of switch speeds is a time difference between when a lift solenoid is energized and when actuation of a diverter element is detected by a sensor.

6. The method of claim 5, wherein each switch speed represents responsiveness of the diverter element.

7. A method for remotely monitoring operation of a plurality of automated banking machines (ABM) comprising:

generating a data record for each one of the ABMs, each data record including a plurality of switch speeds of a switch of each ABM calculated at a different period in time;

transferring the data records for each one of the ABMs to a central evaluation device remote to the ABMs;

comparing the two most recently calculated switch speeds for each ABM using the central evaluation device to identify an observed switch speed change for each ABM;

identifying an acceptable switch speed change for each ABM based on an age of each switch;

comparing the observed switch speed change for each ABM to the acceptable switch speed change for each ABM to determine whether any of the observed switch speed changes are greater than the acceptable switch speed changes; and generating a warning signal specific to each ABM for each observed switch speed change that is greater than the corresponding acceptable switch speed change;

wherein each of the switch speeds is a time difference between when a lift solenoid is energized and when actuation of a diverter element is detected by a sensor.

8. The method of claim 7, wherein each switch speed corresponds to responsiveness of the diverter element.

* * * * *